(12) United States Patent
Seitz et al.

(10) Patent No.: US 11,762,616 B2
(45) Date of Patent: *Sep. 19, 2023

(54) METHOD FOR OPERATING A DRIVER INFORMATION SYSTEM IN AN EGO-VEHICLE AND DRIVER INFORMATION SYSTEM

(71) Applicant: Volkswagen Aktiengesellschaft, Wolfsburg (DE)

(72) Inventors: Gordon Seitz, Ehra-Lessien (DE); Johanna Sandbrink, Braunschweig (DE); Marie Puhle, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/433,902

(22) PCT Filed: Feb. 19, 2020

(86) PCT No.: PCT/EP2020/054315
§ 371 (c)(1),
(2) Date: Aug. 25, 2021

(87) PCT Pub. No.: WO2020/173775
PCT Pub. Date: Sep. 3, 2020

(65) Prior Publication Data
US 2022/0171590 A1    Jun. 2, 2022

(30) Foreign Application Priority Data

Feb. 26, 2019   (DE) .................... 10 2019 202 588.9

(51) Int. Cl.
*G06F 3/14*     (2006.01)
*B60K 35/00*    (2006.01)
(Continued)

(52) U.S. Cl.
CPC .............. *G06F 3/14* (2013.01); *B60K 35/00* (2013.01); *G06T 11/001* (2013.01);
(Continued)

(58) Field of Classification Search
None
See application file for complete search history.

(56) References Cited

U.S. PATENT DOCUMENTS

| 5,661,650 A | 8/1997 | Sekine et al. ............. 701/82 |
| 7,876,203 B2 * | 1/2011 | Traylor .............. G08G 1/165 |
| | | 340/436 |

(Continued)

FOREIGN PATENT DOCUMENTS

| DE | 2241427 A1 | 3/1974 | ............. B60Q 1/44 |
| DE | 19506364 A1 | 8/1995 | ............. B62D 1/28 |

(Continued)

OTHER PUBLICATIONS

Tönnis, Marcus, "Towards Automated Augmented Reality," Dissertation, URL: https://mediatum.ub.tum.de/doc/652549/file.pdf, 305 pages, 2008.

(Continued)

*Primary Examiner* — Jason A Pringle-Parker
(74) *Attorney, Agent, or Firm* — Slayden Grubert Beard PLLC

(57) ABSTRACT

In a method for operating a driver information system in an ego vehicle, environment data are detected in an environment of the ego vehicle. By using the environment data, it is determined whether a lane change of the ego vehicle from a current lane to an adjacent, additional lane may be safely carried out. A driver information display is generated and output, wherein the driver information display comprises a graphic adjacent lane object that represents the adjacent additional lane. The adjacent lane object has a graphic (Continued)

depiction feature that is generated according to whether the lane change may be safely carried out.

15 Claims, 7 Drawing Sheets

(51) Int. Cl.
*G06T 11/00* (2006.01)
*G06T 11/20* (2006.01)

(52) U.S. Cl.
CPC ...... *G06T 11/203* (2013.01); *B60K 2370/166* (2019.05); *B60K 2370/168* (2019.05); *B60K 2370/178* (2019.05); *B60K 2370/191* (2019.05); *B60K 2370/31* (2019.05); *B60K 2370/736* (2019.05)

(56) References Cited

U.S. PATENT DOCUMENTS

| | | | |
|---|---|---|---|
| 8,354,944 B2 | 1/2013 | Riegel et al. | 340/995.19 |
| 8,676,431 B1 | 3/2014 | Mariet et al. | 701/28 |
| 8,686,872 B2 | 4/2014 | Szczerba et al. | 340/905 |
| 9,530,259 B2 | 12/2016 | Hauschild et al. | |
| 10,166,998 B2 | 1/2019 | Kamiya et al. | |
| 2005/0086000 A1 | 4/2005 | Tsuchiya et al. | 701/538 |
| 2005/0190952 A1* | 9/2005 | Nagasawa | G08G 1/166 348/148 |
| 2007/0050127 A1 | 3/2007 | Kellum et al. | 701/439 |
| 2010/0289632 A1* | 11/2010 | Seder | G06V 10/95 382/104 |
| 2011/0199198 A1 | 8/2011 | Yang et al. | 340/426.25 |
| 2011/0293145 A1* | 12/2011 | Nogami | G08G 1/166 382/103 |
| 2011/0301813 A1 | 12/2011 | Sun et al. | 701/41 |
| 2012/0022716 A1 | 1/2012 | Kitahama et al. | 701/1 |
| 2012/0271484 A1* | 10/2012 | Feit | B60W 40/04 701/1 |
| 2012/0271539 A1* | 10/2012 | Bald | B60Q 9/008 701/300 |
| 2013/0057688 A1* | 3/2013 | Furukawa | G08G 1/166 348/148 |
| 2013/0345895 A1* | 12/2013 | Reynolds | G07C 5/008 701/1 |
| 2014/0253310 A1* | 9/2014 | Tippelhofer | B60K 35/00 340/439 |
| 2014/0257686 A1* | 9/2014 | Feldman | B60W 30/12 701/300 |
| 2014/0258928 A1 | 9/2014 | Brush et al. | 715/810 |
| 2014/0285523 A1* | 9/2014 | Gruenler | G06T 19/006 345/633 |
| 2014/0358429 A1 | 12/2014 | Shutko et al. | 701/458 |
| 2014/0362347 A1* | 12/2014 | Oel | B60K 35/00 353/13 |
| 2015/0204687 A1* | 7/2015 | Yoon | G06T 19/006 701/436 |
| 2016/0101730 A1 | 4/2016 | Shehan et al. | 340/431 |
| 2017/0076598 A1* | 3/2017 | Scofield | G07B 15/063 |
| 2017/0136878 A1 | 5/2017 | Frank et al. | 345/619 |
| 2017/0154554 A1 | 6/2017 | Tanaka et al. | 345/7 |
| 2017/0235135 A1* | 8/2017 | Ishiguro | G02B 27/0149 345/633 |
| 2017/0253182 A1 | 9/2017 | Aoki et al. | |
| 2017/0276935 A1 | 9/2017 | Sisbot | |
| 2017/0285647 A1 | 10/2017 | Saito et al. | |
| 2017/0349213 A1 | 12/2017 | Abdel-Rahman et al. | |
| 2018/0058879 A1* | 3/2018 | Tayama | G09B 29/10 |
| 2018/0074497 A1* | 3/2018 | Tsuji | G06V 20/59 |
| 2018/0090007 A1 | 3/2018 | Takemori et al. | |
| 2018/0099665 A1 | 4/2018 | You | |
| 2018/0134217 A1* | 5/2018 | Peterson | G06V 20/58 |
| 2018/0148072 A1 | 5/2018 | Kamiya et al. | |
| 2018/0286094 A1 | 10/2018 | Shishido et al. | |
| 2018/0312110 A1 | 11/2018 | Takae et al. | |
| 2018/0370567 A1 | 12/2018 | Rowell | |
| 2019/0049724 A1* | 2/2019 | Kimura | G06V 20/582 |
| 2019/0138002 A1 | 5/2019 | Mimura et al. | |
| 2019/0226866 A1* | 7/2019 | Chang | G01C 21/3638 |
| 2020/0042807 A1 | 2/2020 | Schutzmeier et al. | |
| 2020/0180619 A1 | 6/2020 | Lee | |
| 2021/0148724 A1 | 5/2021 | Bang et al. | |
| 2021/0192237 A1 | 6/2021 | Guenzel et al. | |
| 2021/0323550 A1 | 10/2021 | Choi | |

FOREIGN PATENT DOCUMENTS

| | | | |
|---|---|---|---|
| DE | 10327869 A1 | 1/2005 | G01C 21/34 |
| DE | 102005046430 A1 | 3/2007 | B60K 31/00 |
| DE | 102005046672 A1 | 4/2007 | B60K 35/00 |
| DE | 102005055744 A1 | 5/2007 | B60W 50/08 |
| DE | 602004011164 T2 | 12/2008 | G08G 1/16 |
| DE | 102008028374 A1 | 12/2009 | G01C 21/36 |
| DE | 102009010121 A1 | 12/2009 | B60K 35/00 |
| DE | 102009031087 A1 | 3/2010 | B60K 35/00 |
| DE | 112006002262 A1 | 12/2011 | G01C 21/36 |
| DE | 102010049721 A1 | 4/2012 | B60W 30/08 |
| DE | 102011121847 A1 | 7/2012 | B60R 1/10 |
| DE | 112010001354 T5 | 8/2012 | G01C 21/00 |
| DE | 102011112943 A1 | 3/2013 | B60K 35/00 |
| DE | 102011116124 A1 | 4/2013 | B60K 35/00 |
| DE | 102012022486 A1 | 8/2013 | B60W 50/14 |
| DE | 2013237290 A | 11/2013 | B60K 35/00 |
| DE | 102012208188 A1 | 11/2013 | B60W 30/16 |
| DE | 102013010818 A1 | 12/2013 | G01C 21/36 |
| DE | 102012214873 A1 | 3/2014 | G08G 1/09 |
| DE | 102012219721 A1 | 4/2014 | B60W 30/12 |
| DE | 102012220100 A1 | 5/2014 | B60K 35/00 |
| DE | 102013016242 A1 | 4/2015 | B60K 31/00 |
| DE | 2015/068269 A1 | 5/2015 | B60K 35/00 |
| DE | 102013225459 A1 | 6/2015 | B60K 35/00 |
| DE | 102014208973 A1 | 11/2015 | B60R 16/02 |
| DE | 102014009985 A1 | 1/2016 | B60K 35/00 |
| DE | 102015114565 A1 | 3/2016 | B60R 16/02 |
| DE | 102015205074 A1 | 3/2016 | B60W 50/14 |
| DE | 102015114614 A1 | 4/2016 | B60W 30/08 |
| DE | 102015212664 A1 | 1/2017 | B60R 16/02 |
| DE | 102015117903 A1 | 4/2017 | B60W 40/12 |
| DE | 102015225346 A1 | 6/2017 | B60W 50/14 |
| DE | 102005046756 B4 | 10/2017 | B60K 35/00 |
| DE | 112016001259 T5 | 11/2017 | B60K 35/00 |
| DE | 102016208372 A1 | 12/2017 | B60W 30/06 |
| DE | 102017112118 A1 | 12/2017 | B62D 6/00 |
| DE | 102016212688 A1 | 1/2018 | G08G 1/0965 |
| DE | 102016115313 A1 | 2/2018 | B60R 1/00 |
| DE | 102017217961 A1 | 4/2018 | G08G 1/16 |
| DE | 102016122301 A1 | 5/2018 | B60R 1/00 |
| DE | 102016223389 A1 | 5/2018 | B60R 1/00 |
| DE | 102017003399 A1 | 10/2018 | B60W 30/08 |
| DE | 102017107484 A1 | 10/2018 | B60W 30/08 |
| DE | 102017208124 A1 | 11/2018 | G06K 9/62 |
| DE | 102017212367 A1 | 1/2019 | B60R 16/02 |
| DE | 102019202576 A1 | 8/2020 | B60W 50/14 |
| DE | 102019202578 A1 | 8/2020 | B60W 50/14 |
| DE | 102019202580 A1 | 8/2020 | B60W 50/14 |
| DE | 102019202581 A1 | 8/2020 | B60W 40/072 |
| DE | 102019202585 A1 | 8/2020 | B60W 50/14 |
| DE | 102019202586 A1 | 8/2020 | B60W 50/14 |
| DE | 102019202587 A1 | 8/2020 | B60W 50/14 |
| DE | 102019202588 A1 | 8/2020 | B60W 50/14 |
| DE | 102019202591 A1 | 8/2020 | B60W 40/02 |
| DE | 102019202592 A1 | 8/2020 | B60W 50/14 |
| EP | 3040830 A1 | 7/2016 | B60K 35/00 |
| EP | 3269579 A1 | 1/2018 | B60K 37/06 |
| EP | 3275716 A1 | 1/2018 | B60K 35/00 |
| EP | 3321913 A1 | 5/2018 | B60K 35/00 |
| EP | 3367366 A1 | 8/2018 | B60R 21/00 |
| EP | 3376366 A1 | 9/2018 | G06F 3/14 |
| EP | 3418161 A1 | 12/2018 | B62D 15/02 |
| FR | 3056804 A1 | 3/2018 | B60W 30/00 |
| GB | 1441606 A | 7/1976 | B60Q 1/44 |
| GB | 2550472 A | 11/2017 | B60R 1/00 |
| JP | 2016182891 A | 10/2016 | B60K 35/00 |

(56) References Cited

FOREIGN PATENT DOCUMENTS

| | | | | |
|---|---|---|---|---|
| JP | 2018203014 A | 12/2018 | ............ | B60R 11/02 |
| WO | 2016/088312 A1 | 6/2016 | ............ | B60K 35/00 |
| WO | 2018/008061 A1 | 1/2018 | ............ | B60K 35/00 |
| WO | 2017/046937 A1 | 8/2018 | ............ | B60K 35/00 |
| WO | 2017/187622 A1 | 11/2018 | ............ | B60W 30/10 |
| WO | 2020/048564 A1 | 3/2020 | ............ | B60K 35/00 |
| WO | 2020/173767 A1 | 9/2020 | ............ | B60K 35/00 |
| WO | 2020/173768 A1 | 9/2020 | ............ | B60K 35/00 |
| WO | 2020/173769 A1 | 9/2020 | ............ | B60K 37/06 |
| WO | 2020/173770 A1 | 9/2020 | ............ | B60K 35/00 |
| WO | 2020/173772 A1 | 9/2020 | ............ | B60K 35/00 |
| WO | 2020/173773 A1 | 9/2020 | ............ | B60K 35/00 |
| WO | 2020/173774 A1 | 9/2020 | ............ | B60K 35/00 |
| WO | 2020/173775 A1 | 9/2020 | ............ | B60K 37/06 |
| WO | 2020/173778 A1 | 9/2020 | ............ | B60K 35/00 |
| WO | 2020/173779 A1 | 9/2020 | ............ | B60K 35/00 |

OTHER PUBLICATIONS

German Office Action, Application No. 102019202591.9, 6 pages, dated Nov. 26, 2019.
German Office Action, Application No. 102019202592.7, 7 pages, dated Dec. 3, 2019.
German Office Action, Application No. 102019202586.2, 7 pages, dated Dec. 6, 2019.
German Office Action, Application No. 102019202588.9, 7 pages, dated Dec. 10, 2019.
German Office Action, Application No. 102019202581.1, 6 pages, dated Dec. 19, 2019.
German Office Action, Application No. 102019202587.0, 7 pages, dated Jan. 8, 2020.
German Office Action, Application No. 102019202585.4, 7 pages, dated Jan. 14, 2020.
German Office Action, Application No. 102019202576.5, 7 pages, dated Jan. 20, 2020.
German Office Action, Application No. 102019202580.3, 6 pages, dated Jan. 29, 2020.
German Office Action, Application No. 102019202578.1, 7 pages, dated Jan. 29, 2020.
International Search Report and Written Opinion, Application No. PCT/EP2020/054297, 20 pages, dated Apr. 8, 2020.
International Search Report and Written Opinion, Application No. PCT/EP2020/054307, 20 pages, dated Apr. 28, 2020.
International Search Report and Written Opinion, Application No. PCT/EP2020/054303, 28 pages, dated May 7, 2020.
International Search Report and Written Opinion, Application No. PCT/EP2020/054299, 18 pages, dated May 7, 2020.
International Search Report and Written Opinion, Application No. PCT/EP2020/054315, 17 pages, dated May 8, 2020.
International Search Report and Written Opinion, Application No. PCT/EP2020/054300, 18 pages, dated May 12, 2020.
International Search Report and Written Opinion, Application No. PCT/EP2020/054319, 21 pages, dated May 13, 2020.
International Search Report and Written Opinion, Application No. PCT/EP2020/054298, 18 pages, dated May 15, 2020.
International Search Report and Written Opinion, Application No. PCT/EP2020/054305, 17 pages, dated May 15, 2020.
International Search Report and Written Opinion, Application No. PCT/EP2020/054321, 20 pages, dated May 28, 2020.
European Office Action, Application No. 20706227.4, 5 pages, dated Dec. 16, 2022.
U.S. Non-Final Office Action, U.S. Appl. No. 17/434,149, 24 pages, dated May 25, 2023.

\* cited by examiner

METHOD FOR OPERATING A DRIVER INFORMATION SYSTEM IN AN EGO-VEHICLE AND DRIVER INFORMATION SYSTEM

CROSS-REFERENCE TO RELATED APPLICATIONS

This application claims priority to German Patent Application No. DE 10 2019 202 588.9, filed on Feb. 26, 2019 with the German Patent and Trademark Office. The contents of the aforesaid patent application are incorporated herein for all purposes.

TECHNICAL FIELD

The present invention relates to a method for operating a driver information system in an ego vehicle, as well as a driver information system in an ego vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles frequently offer a comprehensive selection of various systems that assist the driver to control the vehicle and therefore contribute to an improvement in comfort and safety. One of the challenges in this regard consists of configuring the interface between the human driver and typically computer-based controlling so that the driver is provided with all necessary and desired information as fast as possible and in an easily perceptible manner. Then, the options for assistance may be optimally understood and used. Moreover, the driver must know precisely at every time how his vehicle will behave in a certain situation, which assistance systems are currently active, and whether their optimum functioning is ensured. He should further know how these systems are functioning and the extent to which manual intervention is necessary.

In the following, a "driver assistance system" is understood to be an apparatus of a vehicle that assists the driver to drive the vehicle. Such driver assistance systems may be configured as pure information systems that assist the driver; however, they may also control and regulate apparatuses that automatically influence the locomotion of the vehicle.

By using driver assistance systems, various degrees of vehicle control automation may be achieved. Without an activated driver assistance system, the driver directly influences the movement of the vehicle. If need be, signals or movements of control elements actuated by the driver, such as pedals, the gearshift lever or the steering wheel, are transmitted to corresponding apparatuses of the vehicle which influence the locomotion of the vehicle. Such locomotion of the vehicle corresponds to the lowest degree of automation.

In the case of a higher degree of automation, apparatuses are intervened with partly automatically, which aid the locomotion of the vehicle. For example, the steering of the vehicle or the acceleration in the positive or negative direction is intervened with. In the case of an even higher degree of automation, apparatuses of the vehicle are intervened with such that certain locomotion types of the vehicle, for example straight-ahead driving, may be executed automatically. With a maximum degree of automation, for example routes from a navigation system may be driven substantially automatically, or the vehicle may for example drive automatically on a highway even without a given route. In doing so, however, it is generally ensured that the driver may also immediately recover the control of driving the vehicle, even when there is a high automation level, by actively steering or by actuating the pedals. Moreover, the control may be returned to the driver when a system error arises, or a section that cannot be automatically driven is discerned.

The various driver assistance systems thereby also satisfy various safety functions. Given a low automation level, information is only output to the driver through a driver assistance system or several driver assistance systems that influence the driver in the way in which he moves the vehicle. When there is a higher level of safety functions, warnings are output that require an immediate reaction from the driver. With this automation level, the driver assistance systems do not, however, intervene actively and automatically in the operation of the apparatuses that influence the locomotion of the vehicle.

In the case of an even higher automation level, apparatuses are intervened with partly automatically, which aid the locomotion of the vehicle. With an even higher automation level, there is sufficient intervention in vehicle apparatuses that influence vehicle locomotion for certain maneuvers of the vehicle to be automatically performable, such as for example emergency braking or an intentional escape maneuver to avoid a collision.

The driver of the vehicle is made aware of certain hazards from the notices output by the driver assistance systems. This increases safety while driving the vehicle. When there is an active intervention by a driver assistance system in the locomotion of the vehicle, hazardous driving situations such as collisions or uncontrolled movements of the vehicle may also be avoided when the driver does not directly intervene in the driving process. However, with respect to the safety functions of the driver assistance system, the driver always retains for example the full control and responsibility for the driving situation. The driver assistance system intervenes for example in the event of a collision hazard, or if the driver is no longer able to drive the vehicle, such as for health reasons.

In addition to the direct effect on the controlling of the vehicle where appropriate, it is typically provided in driver assistance systems that the driver is informed of the activity of the driver assistance system with a certain depth of detail. For example, this may be done using visually, acoustically or haptically perceptible signals. This ensures that the driver may estimate the influence of a driver assistance system on driving and may intervene in a controlling manner if appropriate: Furthermore, the driver should typically discern automatic interventions in controlling early on so as not to be surprised by them.

Driver assistance systems that may intervene partially automatically in the controlling of the vehicle and/or notify of potentially hazardous situations through warnings may for example relate to transverse control or longitudinal control of the vehicle. Combinations of these fundamental elements of vehicle control are also conceivable. The transverse control component relates for example to the position of the vehicle perpendicular to the driving direction, i.e., for example the so-called transverse position on a lane or road. Accordingly, for example, an assistant for keeping in a lane may prevent driving over a lane limit, or the vehicle may be driven in the middle of a lane. Furthermore, the driver may be assisted with a lane change or with an overtaking maneuver. Longitudinal control relates for example to the speed of the vehicle in the driving direction that for example is determined depending on legal provisions and road conditions, as well as a safe distance to be maintained from additional road users. A corresponding driver assistance system may help the driver for example maintain a given speed and/or a distance from a preceding vehicle. Furthermore, one's own ego vehicle may be prevented from passing on a certain side; for example, passing on the right in right-hand traffic, or respectively passing on the left in left-hand traffic is prevented, or corresponding warnings are generated.

Lane changes are regularly critical situations in controlling a vehicle. In this case, the danger exists that the driver will overlook another road user, or that one's own vehicle will be overlooked. To prevent the driver or another road user from having to quickly brake or a collision from occurring, the adjacent lane must be closely monitored in such a process.

SUMMARY

A need exists to provide a method for operating a driver information system in an ego vehicle in which the driver may very easily discern whether or not a safe lane change may be carried out.

The need is addressed by a method and a driver information system according to the independent claims. Embodiments of the invention are described in the dependent claims, the following description, and the drawings.

DESCRIPTION

Figure 1:
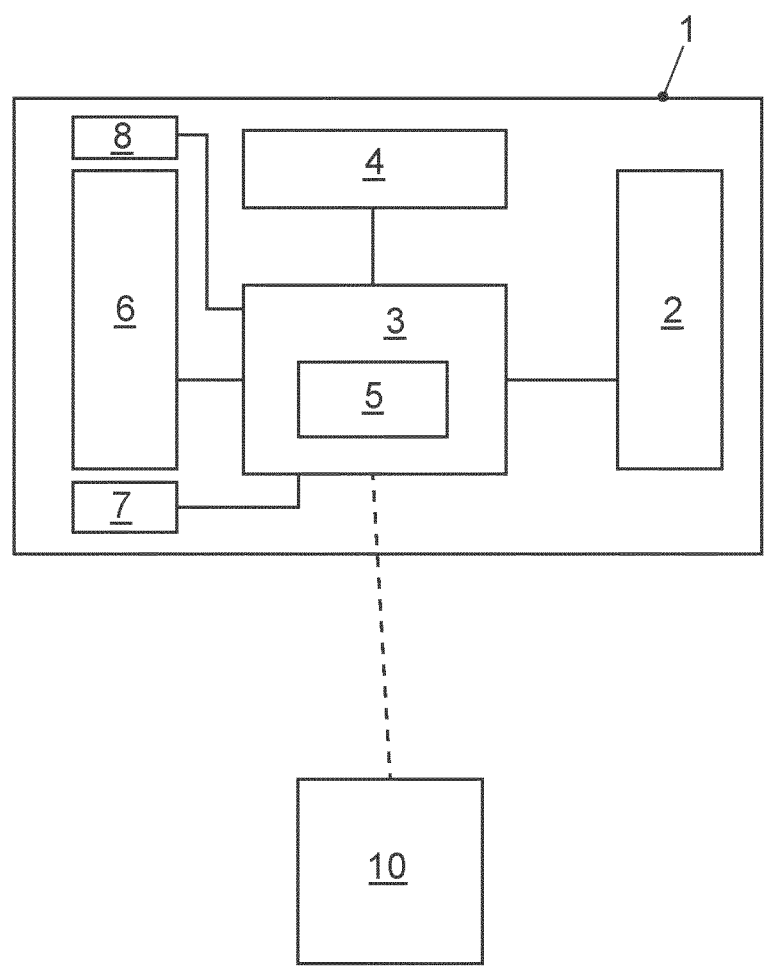
FIG. 1 shows a vehicle with an exemplary embodiment of a driver information.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method according to a first exemplary aspect, environment data in an environment of the ego vehicle are detected. By using the environment data, it is determined whether a lane change of the ego vehicle from a current lane to an adjacent, additional lane may be safely carried out. A driver information display is generated and output, wherein the driver information display comprises a graphic adjacent lane object that represents the adjacent additional lane. The adjacent lane object has a graphic depiction feature that is generated according to whether the lane change may be safely carried out.

The driver information display depicts in a quickly detectable manner whether the driver may carry out the lane change. The integrated graphic depiction makes it easier to understand the information in comparison to other options in which the safety of a lane change is for example depicted by signal lights.

In the method according to the present exemplary aspect, a driver information display is generated and output. Such a display may be designed in different ways and may include elements that are known per se. The display is generated and output for example in a way known per se by means of computing devices and display devices configured therefor. The display output by the driver information display comprises output that is of relevance for controlling the vehicle and its driving. These are for example movement data or states of vehicle systems, as well as if applicable informational and warning output from driver information systems.

The display may be output by means of known display units such as by means of a display, for example on a center console of the ego vehicle, or in an instrument cluster. Furthermore, output may be by means of a field-of-vision display so that at least part of the driver information display is projected into a user's eye so that the display appears superimposed over the visual perception of the physical environment. For example, methods and devices from the field of augmented reality may be used. Known field-of-vision displays such as head-up displays use, for example, the windshield of a vehicle or glasses for projecting.

The output display does not include, for example, an output of a video image that is detected by a camera of the ego vehicle. Instead, the output display data are generated by a computing unit, if applicable using video data from a camera, and the output graphic objects are shown schematically or simplified relative to real objects.

The driver information display may furthermore include control objects or control elements, for example like a graphic user interface. Such objects may for example represent adjustable parameters or activatable and deactivatable functions. They are for example designed selectable and/or actuatable, wherein user input is detected in a manner known per se and evaluated with reference to the particular object.

The driver information display comprises for example a perspective depiction that for example is generated as a 3D depiction. Such a display may facilitate orientation for the driver and make it possible for him to better relate the depicted graphical elements to the current driving situation.

The environment data also serve for example to detect a course of a road, wherein the course of the road section lying in front of the ego vehicle is particularly relevant. For example, the course of the road lying in front of the ego vehicle is detected, for example by using the environment data. The driver information display may then comprise a graphic lane object that represents a lane currently being used by the ego vehicle. This lane object depicts for example the detected course of a road. The adjacent lane object in this case is arranged on the side next to the lane object for the current lane, for example directly adjacent.

The detected course of the road comprises for example information on whether, and to what extent, a route traveled by the ego vehicle has a lateral curvature. The detected data may also relate to other properties of the road, such as an inclination of the road in a direction longitudinal or transverse to the driving direction of the ego vehicle. For example, the data detected on the course of the road include information on the geometric nature of the road. The ego vehicle travels for example on a road that may have several lanes. Typically, the ego vehicle follows the course of one of the lanes as it is driving, wherein a lane change to another lane may be made if desired. The detection of the course of the road may include the course of the currently used lane, or several lanes.

The graphic lane object, that is comprised by the driver information display according to the present exemplary aspect, is generated so that it permits the user, or respectively the driver of the ego vehicle, to bring graphic elements from the driver information display into a spatial relationship with the road that actually lies in front of the ego vehicle. The lane object may relate to the lane currently being used by the ego vehicle. It may furthermore relate to a lane on which the ego vehicle will foreseeably negotiate a curve, for example if, before entering the curve, a lane change is to be carried out. The lane object may furthermore include a plurality of lanes, for example the lane currently being driven on by the ego vehicle, and at least one spatially adjacent lane, for example an adjacent lane for the same driving direction. However, the depiction may also include a personal lane object and at least one adjacent lane object.

The graphic lane object represents the actual course of the road, for example such that the user may assign a virtual position within the driver information display to a physical location on the road located in front of the ego vehicle. For improved orientation of the driver, an ego object may be displayed that represents the ego vehicle. In terms of its detail content, the depiction of the lane object may be reduced or schematic relative to reality. For example, the view of the physical lane from the perspective of the driver of the ego vehicle may be represented mathematically on the graphic lane object by a projection and transformation.

The driver information display does not include, for example, any depiction of image data that are detected by a camera. Instead, the instantiations of the depicted objects are generated by a computing unit.

The graphic lane object comprises for example a perspective view of a curved road, wherein the curvature of the graphic lane object corresponds substantially to the radius of curvature detected for the physical course of the road. The actual course of the road is therefore represented very realistically by the graphic lane object. The lane object is for example generated from a perspective that corresponds to a view from a virtual position just above the ego vehicle.

In some embodiments, a position of the ego vehicle is determined, and it is determined using map data whether the lane change may be safely carried out. This makes it possible to use information included in the map data on lane change or passing options on a road being traveled upon.

For example, it may be recognized whether a change of lane is permitted at a position, for example in a region where overtaking is prohibited. Moreover, the map data may comprise information about whether a lane change may be generally assumed to be safe at a specific position. For example, a very comprehensive database may be obtained in this manner, and the detected data may be very easily supplemented thereby. For example, the map data may already include information on the radius of curvature of the curve of the course of the road.

The position is detected in a manner known per se, for example by means of a navigation satellite system such as GPS. The map data are also provided in a manner known per se, for example from a memory unit of a navigation system of the ego vehicle, or from an external unit with which at least a temporary datalink exists.

The data link between the ego vehicle and an external unit, for example an external server, may for example be wireless, for example through a local network or a larger network, such as the Internet. Furthermore, the link may be established by a telecommunications network such as a telephone network, or a wireless local network (WLAN). Furthermore, the data link may occur by connecting a data cable. The link may also be established by another unit that itself may establish a link to the external server. For example, a data link may exist between the ego vehicle and a cell phone connected to the Internet, for example by a data cable or a radio connection such as by Bluetooth. For example, the link with the external server may be established over the Internet.

Methods from the field of communication between vehicles and other apparatuses (Car2X) may be used. For example, communication with an infrastructure apparatus (Car2Infrastructure) or another vehicle (Car2Car) may occur.

In some embodiments, the environment data are detected by means of sensors of the ego vehicle, for example by means of a camera, a lidar sensor, or a radar sensor. Information on the actual environmental conditions in a specific driving situation are therefore available. For example, data may be used from driver assistance systems which are known per se, for example by a lane change or overtaking assist.

For example, the position and speed, if applicable also an acceleration of an additional road user are detected using the sensors. These parameters are determined for example relative to the ego vehicle. Furthermore, a forecast may be determined of where the additional road user will be located at a later point in time, for example relative to the ego vehicle, and the speed with which it is moving.

The sensors of the ego vehicle each have a detection area. For example, a radar sensor may detect data at a specific spatial angle and up to a specific distance from the ego vehicle. The sensors may be directed in the driving direction, against the driving direction or to the side, and may detect data in correspondingly arranged detection areas.

For example, environment data that are detected by means of a sensor may be fused with map data in order to add information or check its plausibility. Accordingly, for example, it may be determined by using the map data whether a lane change is in principle permissible and, in another step, it may be determined using sensor data whether a lane change may be practically safely carried out.

A lane change is safe when there is no risk of collision with a further road user or a further object; optionally legal restrictions such as prohibited overtaking or a prohibited lane change may be taken into consideration. Objects and further road users are detected in an environment of the ego vehicle by means of the sensors. For example, road users on the neighboring lane for which a lane change is to be evaluated are relevant.

It is detected whether a different road user is currently located in a region of the neighboring lane on which the ego vehicle would travel in the case of a lane change. It is also detected whether a different road user will be located at a future time in such a region if the ego vehicle were to travel in this region, if it were to undertake a lane change. This may relate to other road users who currently travel adjacent to the ego vehicle, who approach at a greater speed from behind or who travel at reduced speed in the driving direction in front of the ego vehicle. An acceleration of a further road user may also be detected and taken into consideration.

Alternatively or additionally, the safety of a lane change may be determined in a different manner. In this case, different environment data may also be detected and different features may be determined using the environment data.

In some embodiments, the driver information display comprises a road user object which represents an additional road user. The road user object is for example displayed relative to an ego object such that the position of the additional road user relative to the ego vehicle is discernible in the display. If the driver for example may detect that the additional road user is located at a position next to the ego vehicle, then this already makes it very clearly detectable that a lane change cannot be safely carried out in this direction.

In some embodiments, a road user object is displayed such that it is displayed adjacent to an ego object that represents the ego vehicle if a safe lane change is impossible. This may for example occur independent of whether an additional road user is in fact precisely next to the ego vehicle; instead, it is only signaled symbolically that a lane change is impossible, and for example a collision hazard is pending.

For example, it may be detected for the adjacent lane whether additional road users are driving on it, or respectively may drive on it, opposite the driving direction of the ego vehicle. The driver information display may for example comprise an object that depicts anticipated or actual oncoming traffic on this adjacent lane, and thereby signals to the driver that a lane change cannot be safely carried out due to the oncoming traffic.

In some embodiments, the graphic depiction feature of the adjacent lane object relates to a brightness, color, transparency, a contrast or a pattern. The driver may identify in a particularly simple manner, for example by the depiction of a flat graphic object, whether a safe lane change is possible.

Alternatively or additionally, other known ways of graphic depiction and, for example, the highlighting of specific objects in a graphic depiction may be used. For example, dynamic depiction modes may also be used, for example by a parameter of the depiction periodically changing, such as for example by changing the brightness with flashing or pulsing or by a periodic color change.

In some embodiments, the driver information display also comprises a graphic traffic sign object, wherein the traffic sign object is arranged, for example, on the lane object or on its edge. This allows recommended measures to be made very clear to the driver. For example, a depiction of a traffic sign may very easily depict whether or not a lane change may be safely carried out at a position.

The traffic sign object may be displayed, for example, such that it appears in the manner of a marking on the graphic lane object applied to the road surface. It may also be depicted as a virtual traffic sign arranged adjacently or above the lane in the driver information display.

The depicted traffic sign object may be configured according to a physical traffic sign which is detected in the environment of the traveled road or the curve when, for example, a warning sign, a speed limit and/or prohibited overtaking has been identified. The traffic sign object may also reproduce a driving recommendation of a driver assistance system, for example in order to recommend to the driver to brake the vehicle to a specific speed.

In some embodiments, another road user is identified in the environment of the ego vehicle, and the driver information display comprises a road user object that represents the additional road user, and that is arranged within the driver information display such that a position relative to the ego vehicle is depicted.

The additional road user is identified in a manner known per se, for example using sensors of the ego vehicle such as a camera, lidar sensors or radar sensors. In doing so, first environment data are detected in the environment of the ego vehicle, and objects are recognized using the environment data. It is determined that one of the objects is an additional road user.

During identification, the additional road user may be assigned an identification number or a similar feature in order to be able to recognize said road user for example over several time intervals, or by using data sets from different sensors.

Features of the additional road user may be detected, and the road user object may be formed depending on the detected features. For example, the graphic road user object has such features that allow the driver to also recognize the represented additional road user in the physical traffic situation. For example, a highly realistic depiction of the additional road user is generated. However, the road user object may be generated such that it is schematically simplified in comparison to the real appearance of the additional road user. This may prevent the driver information display from being overloaded with an unnecessary depth of detail, while it is simultaneously ensured that the driver may bring the display in line with the real driving situation.

For example, a position of the additional road user relative to the ego vehicle is determined, and the arrangement of the road user object in the driver information display is determined depending on this position. For example, the distance between the additional road user and the ego vehicle is discernible from the driver information display.

The identified additional road user may be assigned a road user class, for example depending on a vehicle type. In this manner, a distinction may be made between a passenger car, truck and buses. Furthermore, a more precise classification may be carried out, for example to distinguish between different vehicle models.

A road user object within the driver information display is assigned to the additional road user, and said object is for example generated depending on the road user class. In this instance, the driver may already discern from the driver information display what type of vehicle the additional road user is. The road user object is arranged such that its position relative to the lane object and/or an ego object that represents the ego vehicle may be detected using the display.

For example, the additional road user is a preceding vehicle. This is particularly relevant to the driver of the ego vehicle since he must ensure a safe distance. To accomplish this, a driver assistance system may be provided that supports the longitudinal control of the ego vehicle in order to achieve a given target speed and a given minimum distance.

The road user object is for example generated such that its orientation within a perspective depiction that seems three-dimensional is generated depending on the actual orientation of the additional road user relative to the ego vehicle. For example, a curved course of the road causes additional road users in front of the ego vehicle in the driving direction to appear rotated, whereas for example only the rear is visible of a preceding vehicle on a straight section. This also makes it possible for the driver to be able to very clearly detect the curvature of the course of the road, particularly in a curve.

In some embodiments, an initiated lane changing process of the ego vehicle is detected. For example, an actuation of a turn signal is detected. If the lane change may be safely carried out, an additional graphic signal object is displayed. For example, the signal object may comprise an arrow that points from the area of the lane object for the currently driven lane to an adjacent lane object. The signal object may furthermore comprise a recommended trajectory for the ego vehicle, for example a line that is displayed in the driver information display in relation to the lane object and the adjacent lane object such that a trajectory is represented that may be actually driven by the ego vehicle. For example, the ego vehicle is represented in the driver information display by an ego object whose arrangement relative to the lane object and the adjacent lane object, as well as if applicable to the signal object, makes it possible to locate the trajectory displayed in the driver information display on the physical road surface.

In some embodiments, the adjacent lane object is generated so that it corresponds to a perspective depiction of a course of the road lying in front of the ego vehicle, and comprises a radius of curvature such that the actual radius of curvature of a curve of the course of the road is output. For example, the driver information display furthermore comprises a lane object that represents the current lane of the ego vehicle, and that is also depicted with the actual radius of curvature of the curve. The user may therefore detect very easily, and possibly also with limited vision, how the road is running in front of him.

The actually driven course of a curved road is therefore also reproduced in the driver information display. The driver accordingly recognizes for example hazardous locations that typically lie especially in curved areas.

In some embodiments, a radius of curvature of a curve lying in front of the ego vehicle is determined, and movement data of the ego vehicle are detected. By using the detected movement data and the detected radius of curvature, a criticality is determined, and a graphic lane object is generated with a highlight feature that is generated depending on the determined criticality. The driver may therefore perceive quickly and easily whether and how he must intervene in the controlling of the ego vehicle in order to ensure safe driving.

In some embodiments, the movement data of the ego vehicle include its current speed or a forecast speed upon entering the curve. The output may therefore be adapted very precisely to the actual requirement.

The current speed of the ego vehicle may be detected in a manner known per se by means of sensors of the ego vehicle. Furthermore, it may be determined, for example by means of a driver assistance system, which speed the ego vehicle will have upon reaching a certain position, for example when entering the curve. If for example the ego vehicle is already being braked at the current point in time, the speed at which the ego vehicle will foreseeably reach the beginning of the curve is accordingly determined. Braking may be accomplished for example by actively using a brake device, or the ego vehicle may already be decelerated by the driver releasing the gas pedal or letting the ego vehicle coast.

Furthermore, other movement data may be detected such as an acceleration in a direction along and/or transverse to the driving direction.

In some embodiments, other vehicle parameters are detected, and the criticality is furthermore determined by using the other vehicle parameters. Since data may also be taken into account beyond the movement data of the ego vehicle, the criticality may be assessed very precisely.

In addition to the movement data of the ego vehicle, i.e., for example the speed, other data may also be detected that influence the safe negotiation of the curve and for example the adhesion between the tires of the ego vehicle and the road surface. This comprises, for example, data on the type, the composition, the state and the age of the tires of the vehicle or chassis adjustments.

The criticality determined quantitatively indicates, for example, the urgency with which a manual intervention by the driver is needed in order to ensure safe driving. For example, it may be necessary to manually adapt the speed of the ego vehicle, and/or manually apply a certain steering torque. In doing so, a physical model is used for example in order to determine whether centrifugal forces arise at a speed and the determined radius of curvature of the curve that would lead to a departure from the lane, or respectively the planned trajectory. In doing so, for example additional parameters are taken into account that for example affect the transmission of force between the road and the vehicle.

Moreover, it may be taken into account that standards and regulations for driver assistance systems in the area of transverse control provide limit values for the maximum steering torque to be automatically applied. That is, if required by the radius of a curve and the speed of the ego vehicle, the driver must then manually apply additional steering torque in order to achieve an overall steering torque above the threshold value. The criticality therefore depends for example on the steering torque that must be applied in order to safely negotiate the curve at the current speed of the ego vehicle. This may be calculated by using a physical model depending on the radius of curvature of the curve and the speed, as well as if applicable other parameters.

The criticality may furthermore depend on the type of measures to be introduced. For example, a first value of the criticality may be determined if a deceleration of the vehicle must be initiated in order to drive on the curve with an unchanged level of assistance from a driver assistance system. A second value of the criticality may be determined if a steering intervention is needed. Furthermore, a third value of the criticality may be determined if both a deceleration as well as a steering intervention must be done manually in order to safely negotiate the curve.

The highlight feature of the graphic lane object is configured in a manner known per se and may comprise a highlighted depiction for example by means of color, brightness, contrast, transparency, saturation or shape which directs the attention of a user to a certain object. Colors for highlighting that are typically also used for outputting warnings may for example be red, yellow, and green. In contrast, certain color depictions may evoke a deemphasized highlight, for example with gray, dark or less strongly saturated coloration. Furthermore, a highlight may be achieved by means of a depiction of the lane object that changes over time, for example by a periodic change of the depiction, for example by flashing or pulsing, or by the sudden appearance or disappearance. A change in the depiction over time may refer to a shape or a one-time or periodically depicted change in size of the depicted graphic object. The highlight feature may also be configured as another graphic object such as a frame or a border of the lane object.

The forming of the highlight feature depends on the determined criticality. For example, with a low criticality, the highlight feature may be configured so that it evokes a weak emphasis, for example a depiction of the lane object without a border, or a colored design that is configured to make surrounding graphic objects similar for example in terms of brightness, color and contrast. With a higher criticality, a border or a further highlighted object may be displayed, or the depiction of the lane object may be different from the surrounding graphic objects for highlighting, for example by a contrast-rich depiction in terms of brightness and/or color, or by using a signal color such as yellow or red.

In some embodiments, road surface features are furthermore detected, and the criticality is furthermore determined by using the detected road surface features. The criticality may therefore be determined more reliably not just by using geometric features of the road, but also by using other relevant features of the road surface.

The road surface features relate for example to parameters that are relevant to the transmission of force between the vehicle and the road surface. For example, wetness, snow, ice, oil, or other contaminants on the road may cause the adhesion between the tires and the road surface to worsen, and a curve must be negotiated at a slower speed. Furthermore, the type of road surface may represent relevant information in this context.

The road surface features are detected in a manner known per se. For example, sensors of the ego vehicle may be used such as a camera, a rain sensor, or a sensor system for measuring the adhesion between the tires and road surface, or the wheel slip arising on the surface. Alternatively or in addition, user input or data from an external apparatus may be detected such as weather data for the position of the ego vehicle, or respectively the position of the curve. To accomplish this, data may for example be received via Car2Infrastructure, Car2X or Car2Car communication, wherein a traffic infrastructure, an external unit and/or another vehicle detect/s data on the road surface features and provide said data to the ego vehicle.

In some embodiments, the graphic lane object furthermore has a depiction parameter that is generated depending on the road surface features or weather data. Consequently, the driver may be notified in an easily perceptible manner of circumstances that may impair negotiating the curve and make it necessary to undertake certain measures.

The weather data may be detected in various ways, for example by means of sensors of the ego vehicle such as a rain sensor or a camera, or by receiving data from an external unit such as an external server. For example, the current position of the ego vehicle or the position of the curve may be detected and used for providing the weather data.

The depiction parameter may relate to a texture or a background image in the area of the lane object. Alternatively or in addition, an edge area of the lane object such as a depicted road marker may be depicted in various ways, for example in a certain color. For example, it may be detected that the road is wet, or that rain is currently falling or has fallen in the recent past. A form of depicting the graphic lane object may then be generated that depicts a wet road. Analogously, a graphic depiction of a snow or ice-covered road may be generated. The depiction may also have a certain color or pattern, such as a hatching. Moreover, certain visual features may be depicted by using virtual objects in the display, such as a reflection of an object on the surface of the displayed lane object.

The driver information system according to a second exemplary aspect in an ego vehicle comprises a detection unit which is configured to detect environment data in an environment of the ego vehicle, and an evaluation unit that, by using the environment data, is configured to determine whether a lane change of the ego vehicle from a current lane to an adjacent additional lane may be safely carried out. It further comprises a control unit that is configured to generate and output a driver information display, wherein the driver information display comprises a graphic adjacent lane object which represents the adjacent additional lane. The control unit is furthermore configured to form a graphic depiction feature of the adjacent lane object depending on whether the lane change may be safely carried out.

The driver information system is for example designed to implement the above-described method In some embodiments, the display unit comprises a field-of-vision display for outputting the driver information display. The display may therefore be very easily perceived by the driver. It may furthermore be very easily set in relation to the physical environment of the ego vehicle.

For example, a head-up display, or a display apparatus that is known per se in the field of so-called augmented reality may be used. For example, glasses are known that project a graphic depiction into the eye of a user so that the graphic depiction appears superimposed on the natural perception of the eye. In this manner, additional information may be output in a particularly perceptible manner.

The invention will now be explained based on further exemplary embodiments with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

A vehicle with an exemplary embodiment of the driver information system is described with reference to FIG. 1.

An ego vehicle 1 comprises a detection unit 2 which is coupled to a control unit 3. Said ego vehicle further comprises a display unit 4 and a driver assistance system 6 which are also coupled to the control unit 3. In the exemplary embodiment, the control unit 3 comprises an evaluation unit 5 and is wirelessly coupled by a data connection to an external unit 10, in the exemplary embodiment an external server 10. The ego vehicle 1 furthermore comprises a lighting apparatus 7 as well as a trailer hitch 8 that is also coupled to the control unit 3.

The detection unit 2 in the exemplary embodiment is designed in a manner known per se and comprises a camera that detects image data in a detection area that extends from the ego vehicle 1 at a certain angle in the driving direction forward. It furthermore comprises front, lateral and rear radar sensors that detect data in other detection areas around the ego vehicle 1.

The display unit 4 is also designed in a manner known per se and is integrated in the exemplary embodiment as a display in an instrument cluster of the ego vehicle 1. In other exemplary embodiments, the display unit 4 comprises a head-up display that is configured so that a display is projected into the field of vision of a driver of the ego vehicle 1 so that the display is superimposed on the natural perception of the driver. In other exemplary embodiments, more additional apparatuses are provided for outputting displays, such as those known from the field of augmented reality. Alternatively or in addition, the display unit 4 may comprise a central display in the area of a center console of the ego vehicle 1, or another display in the ego vehicle 1. Moreover, the display unit 4 may comprise several displays.

The driver assistance system 6 comprises several driver assistance modules by means of which the driver of the ego vehicle 1 is assisted in various ways in the controlling of the ego vehicle 1. These are not specified further in the exemplary embodiment. Systems are provided for example for assisting with longitudinal control, for example an assistant for maintaining a given distance from a preceding vehicle, as well as for maintaining a given speed, as well as for assisting with transverse control, for example an assistant for maintaining a travel lane, for example by using road markers, or by following behind a preceding vehicle. Output may be generated by the driver assistance system 6 and for example output by means of the display unit 4, for example in order to display warnings or recommended driving maneuvers to the driver. Furthermore, various driver assistance modules may actively intervene in control devices of the ego vehicle 1.

The lighting apparatus 7 comprises various apparatuses that serve as lighting that is capturable outside of the ego vehicle 1. In the exemplary embodiments, headlamps are included for generating daytime driving light, low beams, high beams and a parking light. Furthermore, turn signals as well as side marker lights and other signal lights are included. Furthermore, taillights, brake lights, retro-reflectors, rear fog lights and backup lights are included that for example are arranged on the rear of the ego vehicle 1 so that they are visible for traffic approaching from the rear.

The trailer hitch 8 is designed in a manner known per se and comprises elements that are suitable for coupling to the attached device. This may for example be a trailer. Electrical connections are also provided for this by means of which, for example, a lighting system of a trailer may be controlled. The trailer hitch in the exemplary embodiment furthermore comprises sensors that detect a mounted mass as well as, if applicable, traction of a trailer, for example in order to determine the presence of a trailer as well as, if applicable, its type.

An exemplary embodiment of the method will be explained with reference to FIG. 2. In doing so, the aforementioned ego vehicle explained with reference to FIG. 1 with an exemplary embodiment of the driver information system will be referenced and further specified by the description of the method.

Figure 2:
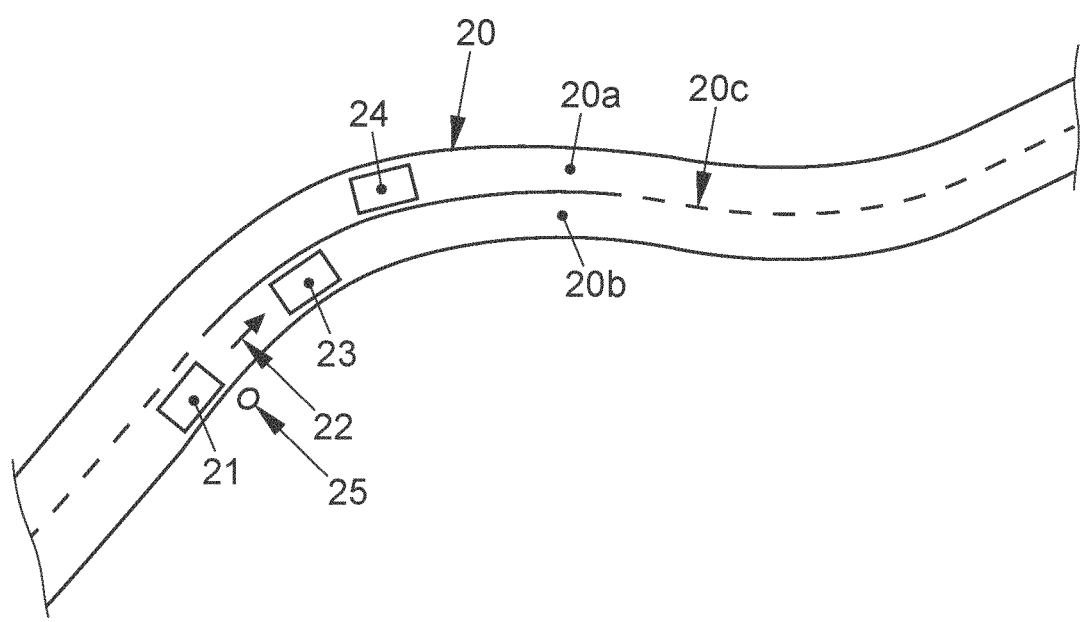
FIG. 2 shows an exemplary traffic situation with vehicles on a road.

An ego vehicle 21 that corresponds in the exemplary embodiment to the ego vehicle 1 shown in FIG. 1 drives in a driving direction indicated by an arrow 22 on a road 20 that has two lanes 20*a*, 20*b*. A traffic sign 25 is arranged in the area of the road 20. A preceding vehicle 23 is located on the same lane 20*b* as the ego vehicle 21, whereas an oncoming vehicle 24 is located on the adjacent lane 20*a*. The road 20 has a course with curves, wherein in the exemplary embodiment shown in FIG. 2, the ego vehicle 1 is approaching a right-hand curve followed by a left-hand curve.

By means of the detection unit 2, the ego vehicle 21 detects the course of the road lying in front of it in the driving direction. To do this, in the exemplary embodiment, image data are detected by means of the camera included in the detection unit 2 and evaluated in another step in order to determine the course of the road. To do this, for example the geometric configuration of the road 20, or respectively the lane 20*b* currently being driven on by the ego vehicle 1 is determined. Alternatively or in addition, other sensors of the ego vehicle 1 are provided for detecting in other exemplary embodiments.

By using the data detected by the detection unit 2, the road markers that divide the two lanes 20*a*, 20*b* from each other are also detected. Moreover, additional road markers (not shown in FIG. 2) at the edges of the road 20 are detected. Demarcation marker classes are determined for the road markers, in the present case a "dashed line" and "solid line", for different areas of the middle line between the lanes 20*a*, 20*b*, and a "solid line" for the edge markers of the road 20. In other exemplary embodiments, a road marker of the demarcation marker class "double solid line", "parallel broken and solid line" or a similar configuration may also be determined. In addition, a curb or a transition from the road 20 to an adjacent shoulder may be detected as a demarcation marker and correspondingly classified.

In addition, in the exemplary embodiment, the current position of the ego vehicle 1 is detected and, by using this position, map data are provided that include information on the course of the road. A fusion of the map data as well as the detected sensor data is performed, and the actual course of the road in the driving direction lying in front of the ego vehicle 1 is determined.

By means of the detection unit 2, the ego vehicle 21 also detects weather data. In the exemplary embodiment, a rain sensor as well as the camera are used for this. Alternatively or in addition, in other exemplary embodiments, relevant weather data are retrieved from an external unit 10 by using the determined position of the ego vehicle 21. Furthermore, data on the weather at the position of the ego vehicle 21 provided from an infrastructure or for example by a radio station may be detected.

The detected weather data include information on rain and snow, both at the current point in time as well as in the recent past. From this it is inferred whether the road section lying in front of the ego vehicle 21 is wet, or has slippery snow. Furthermore, the weather data relate to the danger of slippery ice. For example, the current temperature of the air or the road surface is taken into account for this; if the temperature lies below the freezing point or another threshold value, an icy road is assumed. Other types of precipitation such as hail or sleet are also taken into account.

Furthermore, the detection unit detects movement data from the ego vehicle 21, for example its current speed and acceleration. In other exemplary embodiments, a speed and acceleration of the ego vehicle at a later point in time is forecast, for example for a forecast point in time of the entry of the ego vehicle 21 into a curve. In other exemplary embodiments, furthermore, other data on the ego vehicle 21 are detected, for example on the nature of its tires and adjustments of its chassis that affect the behavior of the ego vehicle while negotiating a curve.

The evaluation unit 5 determines the radius of curvature of the curve lying in front of the ego vehicle 21 based on the detected course of the road. In other exemplary embodiments, the radii of curvature of other curves may also be determined, for example to enable more foresighted driving. Then, the information on the speed of the ego vehicle 21 and the radius of curvature of the curve lying in front of the ego vehicle 21 are used to determine a value of criticality.

To determine the criticality, the steering torque for the ego vehicle 21 needed to negotiate the curve at the current or forecast speed is determined, for example by the driver assistance system 6. The determined steering torque is compared with a threshold value that is defined in the driver assistance system 6 for a maximum steering torque for automatic assistance in holding the lane 20*b*. If this threshold value is exceeded, the driver assistance system 6 cannot intervene automatically to assist with a sufficiently large steering torque in order to enable the ego vehicle 21 to safely negotiate the curve. That is, the driver of the ego vehicle 21 must intervene in the controlling of the ego vehicle 21 by applying additional steering torque and/or reducing the speed by decelerating the ego vehicle 21.

In other exemplary embodiments, it is determined alternatively or in addition whether the ego vehicle 1 may physically negotiate the curve safely at the detected or forecast speed. If it is determined that this is impossible or is associated with risks, it is defined as a higher criticality. In doing so, for example the physically possible transmission of force between the tires of the ego vehicle 1 and the road surface is taken into account. With a higher criticality, for example braking the ego vehicle 1 or selecting a greater curve radius is necessary.

In the exemplary embodiment, different driver assistance modules of the driver assistance system 6 may be activated, wherein different levels of automation may also be achieved. The driver may for example select a low automation level in which the longitudinal and transverse control of the ego vehicle 1 are substantially manual. The driver may add modules that output warnings or recommendations with respect to controlling; this corresponds to a low automation level. Moreover, the driver may enable modules that take over individual tasks of longitudinal and transverse control; this corresponds to a higher automation level. Furthermore, the driver may enable driver assistance modules that automatically support both longitudinal control as well as transverse control; this corresponds to an even higher automation level. The threshold value for the steering torque that a driver assistance module for transverse control may apply may depend on the specific module or the driver assistance system 6.

Figure 3:
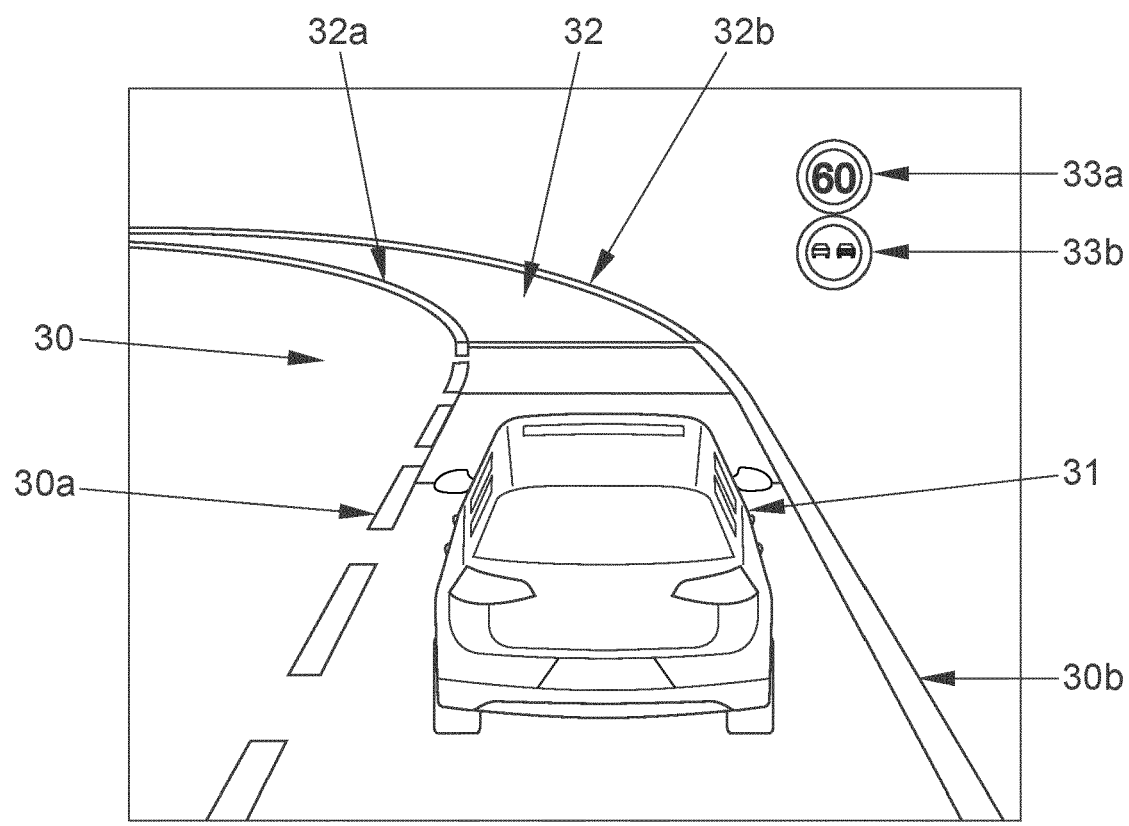
FIG. 3 shows an exemplary embodiment of a driver information display generated while negotiating a curve.

While driving, the control unit 3 generates a driver information display that is output by the display unit 4. An exemplary embodiment of such a display is shown as an example in FIG. 3.

The driver information display comprises an ego object 31 that is configured as a perspective view of the ego vehicle 21 from the rear from a slightly elevated virtual position so that an area lying in front of the ego vehicle 21 may also be depicted. The display furthermore comprises a lane object 30 that is arranged so that the ego object 31 is displayed thereupon. The lane object 30 represents the current lane 20b on the road 20 actually being driven by the ego vehicle 21.

In other exemplary embodiments, other graphic objects are displayed for other and for example adjacent lanes that for example are configured analogously to the shown lane object 30.

In the exemplary embodiment, the lane object 30 is bordered by a dashed left 30a and a broken right road marker 30b. The depicted marker types correspond to the actual markers on the lane 20a according to the previously determined demarcation marker classes. In other exemplary embodiments, the road markers may be generated by using other criteria, for example in order to symbolize whether a lane change is permissible and possible in the direction of a road marker.

The lane object 30 represents the detected course of the physical lane 20b on which the ego vehicle 21 is currently located. A curve located in front of the ego vehicle 21 is represented by a curve area 32 of the lane object 30. Its geometric shape is generated so that it reproduces the actual radius of curvature of the curve in the perspective depiction.

The lane object 30 is generated with the curve area 32 depending on the criticality determined for the curve. In the exemplary embodiment, the road markers 32a, 32b that border the side of the depicted lane in the curve area 32 are configured so that the driver is notified of a necessary manual intervention. This is done by depicting in a certain color, such as red, when the value of the determined criticality exceeds a threshold value. In the exemplary embodiment, the road markers 32a, 32b in the curve area 32 are then no longer generated so that they reproduce the actual markers on the lane 20b; instead, they are depicted as solid in order to notify the driver of their importance in the curve.

In other exemplary embodiments, the lane object 30 has other highlight features than the color of the road markers 32a, 32b in the curve area 32 such as a color of the surface of the depicted lane 32 so that the highlighting is over a large area. In other exemplary embodiments, other depictions may be generated depending on the value of the criticality, for example with other colors that are determined by using the criticality value and a scale. Furthermore, dynamic depictions may be generated, for example with flashing objects.

In the exemplary embodiment, the driver information display furthermore comprises depictions of traffic signs 33a, 33b that signal a speed limit and a prohibition on passing in the area of the curve. These traffic signs 33a, 33b may also be displayed in the area of the lane object 30 so that they appear on its surface, or they may be displayed like actual traffic signs 25 on the edge of the lane object 30. The traffic signs 33a, 33b in the exemplary embodiment correspond to an actual traffic sign 25 arranged on the edge of the road 20; in other exemplary embodiments, traffic signs may however also be generated by using driving recommendations of the driver assistance system 6, for example when a certain maximum speed for safely negotiating a curve was determined, or when the area of the curve is assessed as being unsafe for passing.

In other exemplary embodiments, acoustically and/or haptically perceptible warning messages may furthermore be output depending on the criticality. Furthermore, other optical warning messages may also be displayed, for example by means of a warning symbol.

In another exemplary embodiment, the driver assistance system 6 is configured to determine whether a speed is reached upon entering the curve that permits safely negotiating the curve. If, despite the highlighting of the curve section 32 in the driver information display, the driver does not initiate suitable measures, safety measures may be automatically initiated in order to bring the ego vehicle 1, 21 into a safe state. Accordingly, braking may for example be performed that brings the ego vehicle 1, 21 to a safe speed.

In the exemplary embodiment, it is furthermore proposed that the graphic depiction of the ego vehicle 31 in the driver information display is arranged at a fixed position. The depiction therefore corresponds to a perspective from a fixed point relative to the ego vehicle 21, for example from a position of the driver, or a position arranged above the ego vehicle 21. The depiction is generated so that a movement is depicted while driving so that other objects that present the environment of the ego vehicle 21 move relative to the depicted ego object 31. It is shown for example that the lane markers 30A, 30B move relative to the ego object 31, and the arrangement of the lane object 30 also changes relative to the ego object 31. For example, the lane object 30 changes while negotiating the curve so that its curvature is changeably depicted, and the lane object 30 again runs completely straight for example at the exit of the curved area, or respectively with a changed detected radius of curvature.

In some exemplary embodiments, further road users are detected and output as road user objects on the driver information display. The road user objects are displayed relative to the ego object 31 so that the physical position and speed of the associated road users is discernible from the display. The road user objects are also depicted as rotated corresponding to the course of the road so that they for example are visible obliquely from the side when they are driving on an area of the road that is curved relative to the orientation of the ego vehicle 21.

In some exemplary embodiment, the display unit 4 comprises a head-up display, and at least the lane object 30 of the driver information display is displayed in this manner. It may for example be displayed so that it appears to be superimposed on the lane 20b actually perceived from the position of the driver. The curve area 32 is then highlighted so that the driver may evaluate the criticality in the area lying in front of him and may discern that a manual reduction of speed or an additional application of steering torque is required to safely negotiate the curve.

Another exemplary embodiment of a driver information display that is generated and output in the method while taking into account weather data will be explained below with reference to FIGS. 4A, 4B and 4C. The display is similar to the display explained above with reference to FIG. 3. Only additional features will therefore be explained. Comparable objects are identified with the same reference numbers.

In this exemplary embodiment, the driver information display furthermore comprises graphic elements 40a, 40b for adjacent lanes. These are positioned laterally next to the lane object 30 on which the ego object 31 is arranged and continue the road to the side in a perspective depiction. In the exemplary embodiment, only road markers 30a, 30b are shown at the edges of the lane object 30 for the vehicle's own lane 20b. In this case as well, the depicted marker types correspond to the actual markers on the road 20 according to the previously determined demarcation marker classes.

Figure 4A:
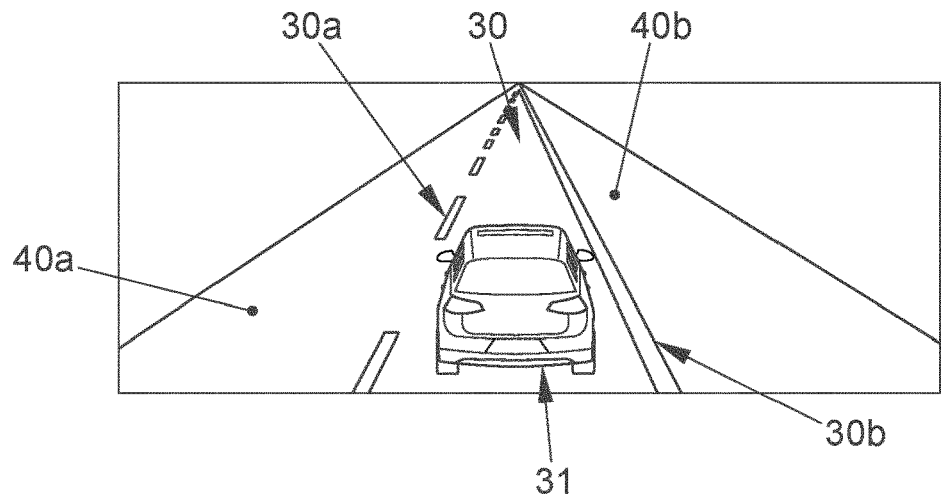
FIG. 4A to 4C show other exemplary embodiments of driver information displays generated taking into account weather data.

In the case shown in FIG. 4A, it was detected that the surface of the road is dry. The driving objects 30, 40a, 40b are shown without any structuring, for example uniformly black or gray.

Figure 4B:
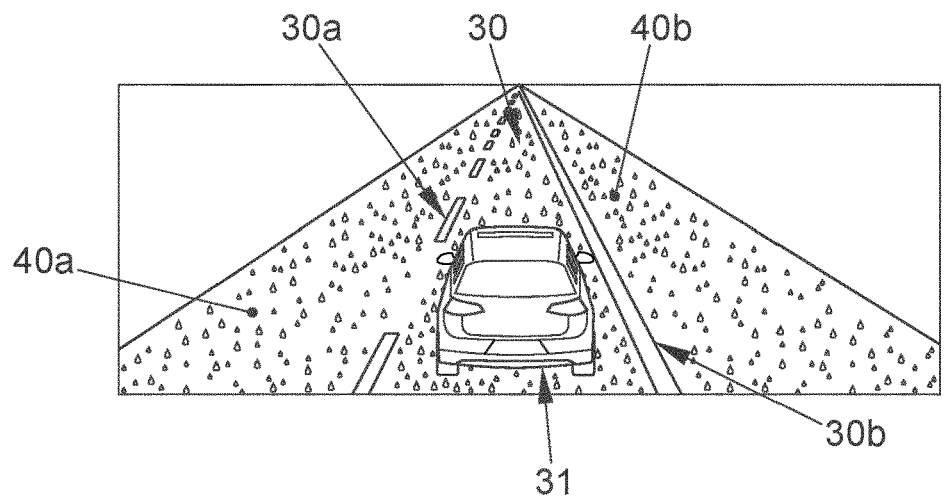

In the case shown in FIG. 4B, it was detected that the surface of the road is wet. The graphic objects for depicting one's own lane 30 as well as the left 30a and right 30b adjacent lanes are depicted with a pattern that represents raindrops in this example. In other exemplary embodiments, other forms of structuring may be depicted; furthermore, dynamic depictions such as moving structures in the area of the graphic objects 30, 40a, 40b are also conceivable. In another exemplary embodiment, other objects are also depicted such as further road users whose mirror images are depicted on the road depicted as wet with rain. Furthermore, spray may be depicted in the area of road user objects that move over the road.

Figure 4C:
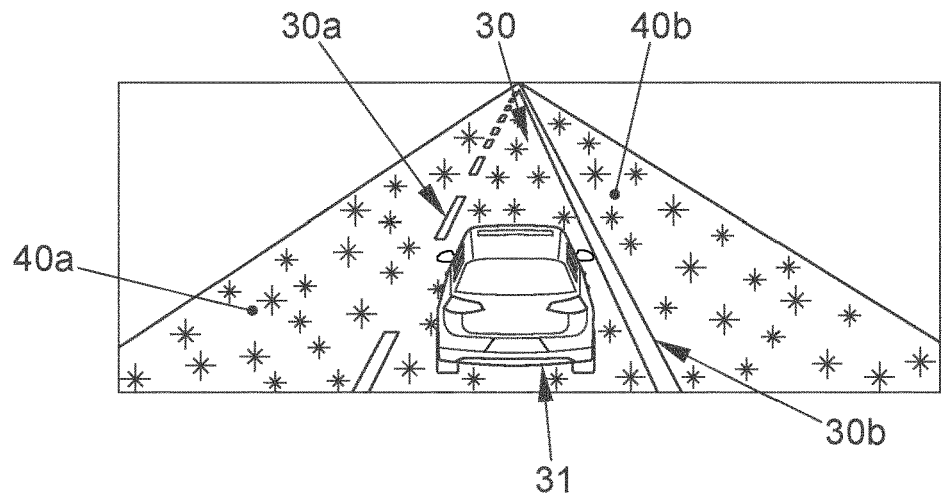

In the case shown in FIG. 4C, it was detected that the road is at least partially covered with snow. Analogous to the case shown in FIG. 4B, the objects for the lanes 30, 30a, 30b are depicted structured in this case as well, wherein a pattern of a snow surface is shown. In this case as well, other forms of structuring as well as dynamic depictions are conceivable.

In other exemplary embodiments, the graphic objects for the lanes 30, 40a, 40b are depicted such that other features of their surface are represented. These may be for example contaminants, oil or markers on the road.

With reference to FIG. 5A to 5D, other displays will be explained that may be generated and output with the method taking into account different types of road markers. In this case as well, the driver information system explained with reference to FIG. 1 will be assumed, and the objects will be identified if possible with the reference numbers already used above.

Figure 5A:
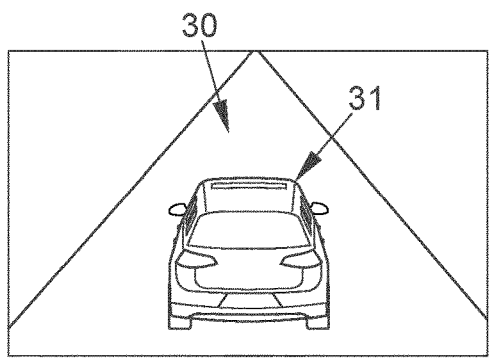
FIG. 5A to 5D show other exemplary embodiments of driver information displays generated taking into account various types of road markers.

In the case shown in FIG. 5A, no road markers were recognized on the road 20. Only the ego object 31 that represents the ego vehicle 21 is depicted as well as a lane object 30 that is shown as uniformly gray in the exemplary embodiment. In other exemplary embodiments, other depictions are possible; however, the display is such that no objects comparable with a road marker are displayed. The driver may see from this display that the ego vehicle 21 is being driven without orientation from recognized road markers so that for example driver assistance systems for transverse control may only be used restrictedly or not at all.

Figure 5B:
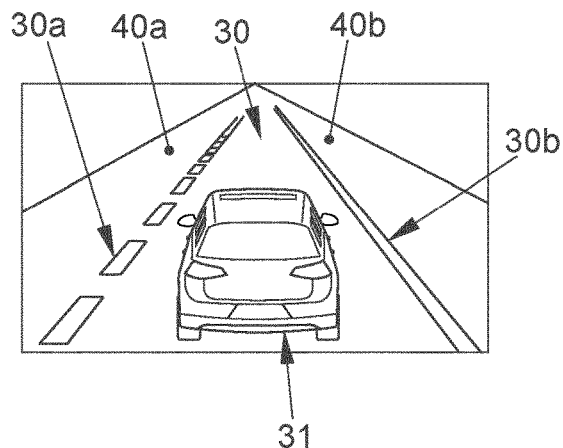

In the case shown in FIG. 5B, it was recognized that the lane 20b on which the ego vehicle 21 is located is bordered on the left and right by lane markers. These were assigned the demarcation marker classes of "broken road marker", or respectively "solid road marker". Furthermore, adjacent lanes were recognized. In addition to the ego object 31 and the lane object 30 that represents the currently used lane 20b, the driver information display also comprises graphic objects for the left 40a and right 40b adjacent lanes as well as road markers 30a, 30b that are generated according to the detected demarcation marker classes and represent essential characteristics, i.e., the broken, or respectively solid embodiment corresponding to the actual road markers.

Figure 5C:
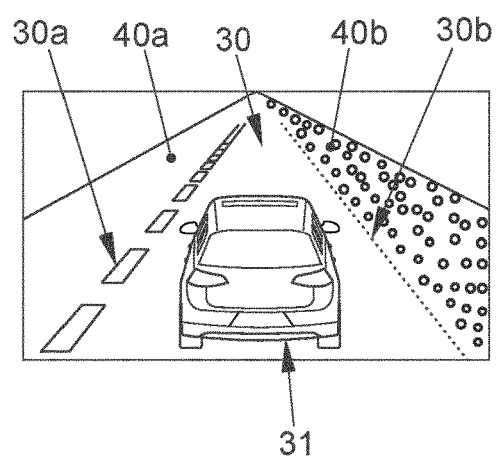

In the case shown in FIG. 5C, it was recognized that, different than the case shown in FIG. 5B, the lane 20b of the ego vehicle 21 is not bordered by a right lane marker. Instead, a transition from the road to a shoulder area was detected. In contrast to the case shown in FIG. 5B, this is output by the driver information display in that the graphic object 40b depicts a shoulder area for the right adjacent lane that borders the lane object number 30 with the ego object 31.

Figure 5D:
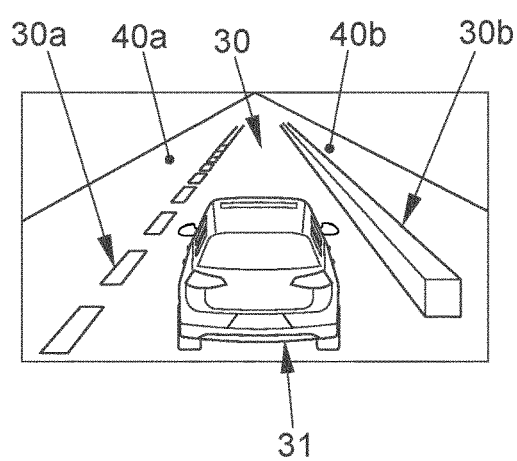

The case shown in FIG. 5D differs from that in FIG. 5B in that the current lane 20b of the ego vehicle 21 is bordered on the right by a curb. This is displayed in the driver information display in that a graphic demarcation object 30b that represents a curb is depicted on the right next to the lane object 30.

In other exemplary embodiments, road markers may also be guardrails, vegetation or roadside structures, or other demarcation markers and structures according to the various demarcation marker classes.

Figure 6A:
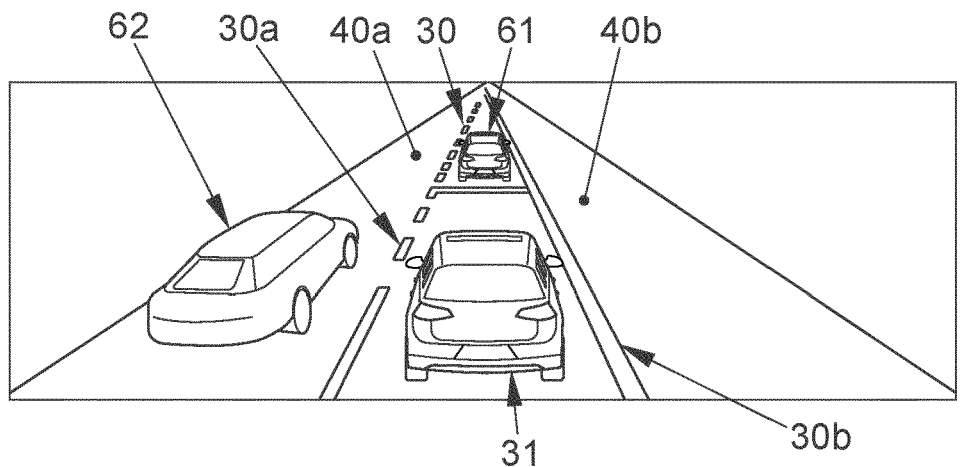
FIG. 6A to 6C show other exemplary embodiments of driver information displays generated for a planned lane change.
Figure 6B:
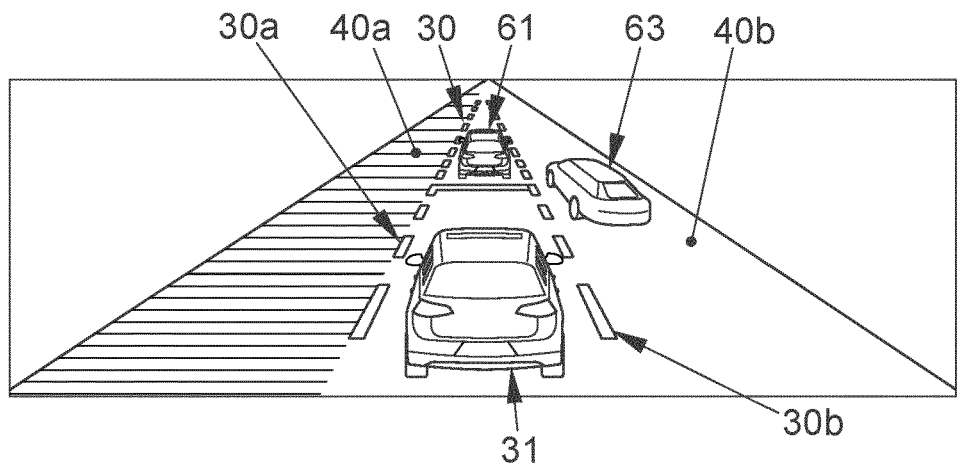
Figure 6C:
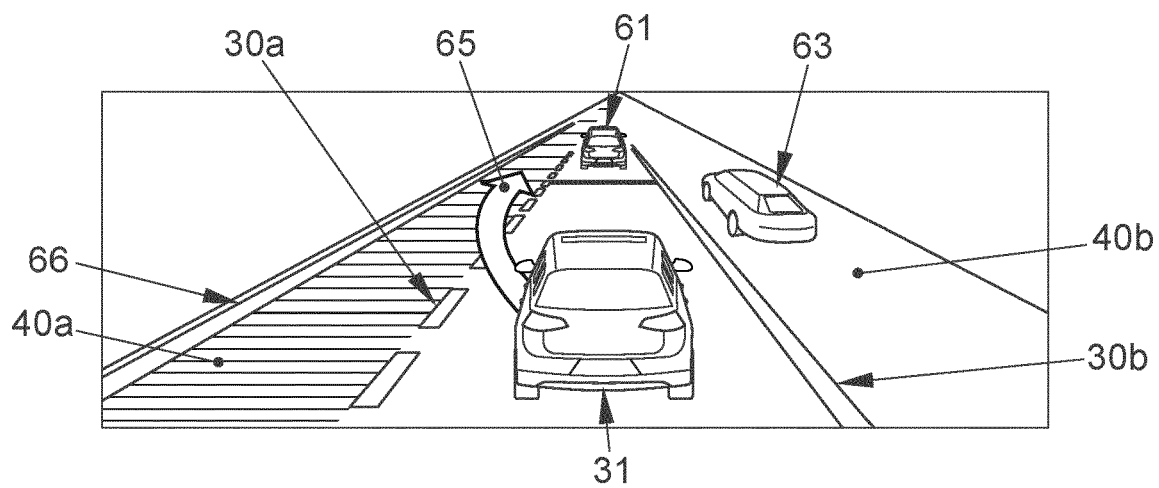

With reference to FIG. 6A to 6C, other displays will be explained that may be generated and output using the method for a planned lane change. In this case as well, the driver information system explained with reference to FIG. 1 will be assumed, and the objects will be identified if possible with the reference numbers already used above.

FIG. 6A to 6C each include an ego object 31 that represents the ego vehicle 21. This is displayed statically and always arranged at the same position within the driver information display. The movement of the ego vehicle 21 is depicted in that the depicted environment moves relative to the ego object 31 as it appears from the coordinate system of the ego vehicle 21. For example, structures of the road move relative to the static ego object 31, including curved areas as well as road markers 30a, 30b, corresponding to the actual proper movement of the ego vehicle 21 on the road 20.

The perspective of the display is generated from a position slightly behind and above the virtual ego object 31. Each display comprises a lane object 30 that represents the currently used lane 20*b* of the ego vehicle 21, as well as adjacent lane objects 40*a*, 40*b* for adjacent lanes 20*a*.

In all cases, a preceding vehicle 23 was also detected that will now be represented by a road user object 61 which is arranged in the depiction in front of the ego object 31. The depiction is generated such that the displayed distance between the ego object 31 and object of the proceeding vehicle 61 represents the actual distance between the vehicles. That is, by using the display, the driver may perceive the actual distance and may for example notice changes.

The further road user is depicted by the virtual road user object 61 so that essential features of its real appearance relevant to the depiction are reproduced in the display. In this regard, the vehicle type and the color of the further road user 23 are detected in the exemplary embodiment. The detection takes place by a camera of the ego vehicle 1. Alternatively or in addition, in other exemplary embodiments, a datalink to the additional road user 23 is also established, particularly by means of Car2Car communication. The graphic road user object 61 assigned to the preceding road user 23 is then generated so that it correctly reproduces the depiction of the vehicle type. Alternatively or in addition, in other exemplary embodiments, other features of the preceding vehicle 23 may also be reproduced in the depiction of the corresponding graphic road user object 63.

FIG. 6A to 6C furthermore include a horizontal line arranged in front of the ego object 31 on the lane object 30 that depicts a set minimum distance of the ego vehicle 21 from the preceding vehicle 23.

In the case shown in FIG. 6A, it was detected that the current lane 20*b* is bordered on the right by a solid line and on the left by a broken line. The detected road markers were assigned to corresponding demarcation marker classes, and the demarcation markers are reproduced by depictions of corresponding road markers 30*a*, 30*b*.

Furthermore, a further road user located at the approximate level of the ego vehicle 21 was detected on a lane adjacent on the left. The display comprises a corresponding graphic road user object 62 on a left adjacent lane object 40*a* that reproduces the real arrangement of the vehicles. In this driving situation, it was determined that the ego vehicle 21 cannot safely change to the left adjacent lane. The left adjacent lane object 40*a* is therefore not highlighted but is rather colored a uniform gray.

In the case shown FIG. 6B, an additional road user was also detected on an adjacent lane, but this time on the right adjacent lane, however. The driver information display therefore comprises a road user object 63 in the area of the right adjacent lane object 40*b*. It was determined that a lane change to the left adjacent lane may be done safely. The left adjacent lane object 40*a* is therefore highlighted. In this and other exemplary embodiments, various highlights may be used, for example by means of hatching, color, brightness, or by a dynamic effect such as flashing.

In the case shown in FIG. 6C, it was furthermore detected proceeding from the case explained above with reference to FIG. 6B, that the driver of the ego vehicle 21 has activated a left blinker. With this, he signals that he wants to carry out a lane change to the left. The ego object 31 is output in the depiction with a shining flashing light. Since in the depicted driving situation the lane change to the left may be done safely, an arrow 65 is displayed as a signal object 65 in addition to the highlighting of the left adjacent lane object 40*a*. The case is for example configured to be the color green. In other exemplary embodiments, the color may depend on whether the lane change may be done safely; if this is not the case, the arrow 65 may for example be colored red. Furthermore, the signal object 65 may also be configured differently, for example like chaser lights or with another symbol.

In the case shown in FIG. 6C, it was furthermore detected that the left adjacent lane is bordered on the left by a solid line. Moreover, the current lane 20*b* of the ego vehicle 21 is bordered on the right by a solid line. These road markers are correspondingly displayed in FIG. 6C by using demarcation objects 30*a*, 30*b*, 66.

In other exemplary embodiments, it is detected that the further road user 23 is planning a certain driving maneuver. To accomplish this, light signals from a turn signal are evaluated, or information is received via a Car2Car link. A driving maneuver object is displayed for the road user object 61 that signals that the preceding vehicle 23 is for example planning a lane change.

Figure 7A:
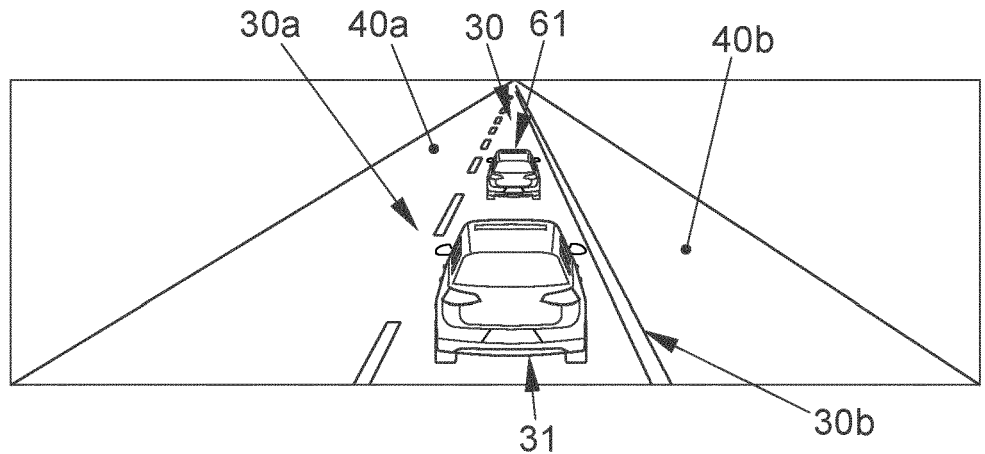
FIG. 7A to 7C show other exemplary embodiments of driver information displays generated taking into account impending oncoming traffic, if applicable.
Figure 7B:
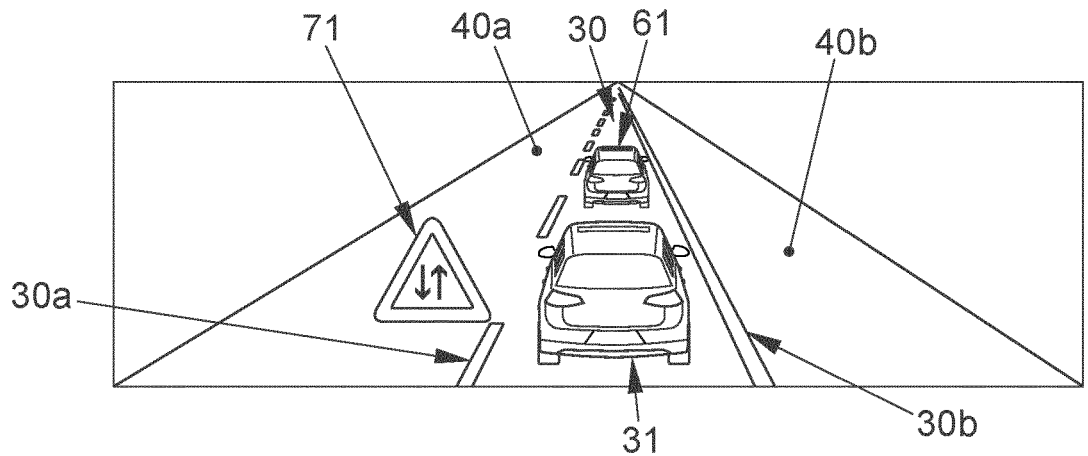
Figure 7C:
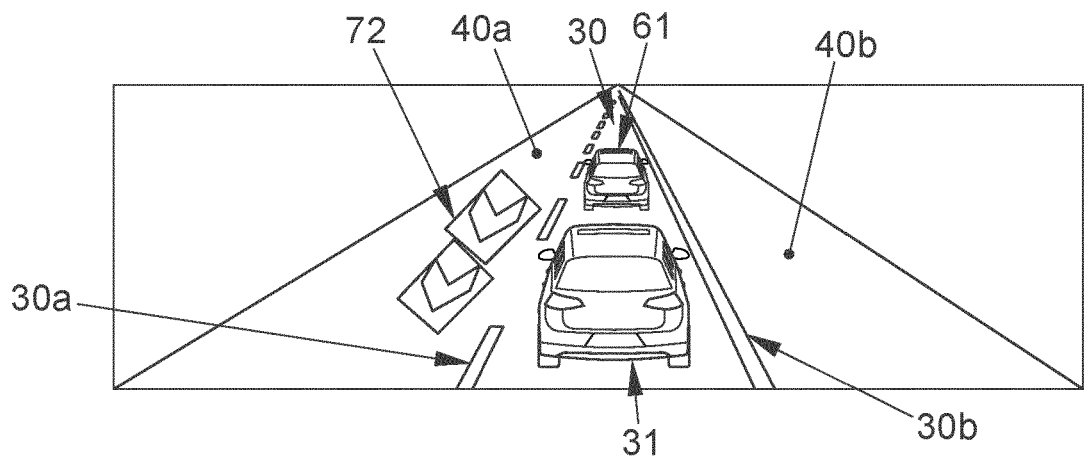

With reference to FIG. 7A to 7C, other displays will be explained that may be generated and output with the method taking into account impending oncoming traffic, if applicable.

In this case as well, the driver information system explained with reference to FIG. 1 will be assumed, and the objects will be identified if possible with the reference numbers already used above.

In the case shown in FIG. 7A, no oncoming traffic was detected on the lane of the ego vehicle 21 as well as on the adjacent lanes. In this case, the depiction comprises the lane object 30 as well as right and left bordering adjacent lane objects 40*a*, 40*b*. Furthermore, an ego object 31 as well as a preceding vehicle 23 is depicted by a road user object 61.

In the cases shown in FIGS. 7B and 7C, it was recognized that oncoming traffic may be anticipated in the lane 20*a* arranged on the left in the driving direction next to the current lane of the ego vehicle 21. The depictions differ from the depiction depicted above with reference to FIG. 7A in terms of a graphic oncoming traffic warning object 71, 72 that is arranged on the adjacent lane object 40*a*. The depiction is for example like a road marker placed on a road surface.

In the exemplary embodiment, the oncoming traffic warning object 71, 72 moves with the ego object 31. In other exemplary embodiments, the oncoming traffic warning object 71, 72 in the coordinate system of the depicted road surface may be static so that the ego object 31 appears to move past the oncoming traffic warning object 71, 72. In this case, the oncoming traffic warning object 71, 72 may repeatedly appear in multiple executions, for example in periodic intervals as long as oncoming traffic on the adjacent lane 20*a* is to be anticipated.

Alternatively or in addition, in other exemplary embodiments, an oncoming road user object is depicted in the area of a lane object when it was determined that oncoming traffic is to be anticipated on the lane. The oncoming road user object may be configured so that it depicts an actual oncoming road user. It may furthermore be displayed even if no further road user was detected in order to warn the driver of the potential occurrence of oncoming traffic. The depiction of the oncoming road user object may differ if it represents an actually detected road user, or if it is only being displayed as a warning.

In another exemplary embodiment, states of the lighting system 7 of the ego vehicle 1 are detected, and the depiction of the ego object 31 in the driver information display is generated so that it reproduces the states of various elements of the lighting apparatus 7. For example, rear lights and headlamps may be displayed illuminated or unilluminated corresponding to the detected states.

In another exemplary embodiment, an operating state of a trailer hitch of the ego vehicle is 1 detected. A trailer hitch of the ego vehicle 1 is detected. If it is detected that a trailer object is on the trailer hitch, then the ego object 31 is generated in combination with a graphic depiction of a trailer.

The display is such that the ego object 31 with the graphic trailer depiction is displayed in a perspective from the rear such that a road section of the road object 30 lying in front of the ego object 31 in the depiction is visible.

The trailer depiction may differ depending on the type of trailer object, for example in terms of its size, shape and color. For example, a schematically simplified image of the real trailer object is reproduced by the graphic trailer depiction.

LIST OF REFERENCE NUMERALS

1 Ego vehicle
2 Detection unit; sensor
3 Control unit
4 Display unit
5 Evaluation unit
6 Driver assistance system
7 Lighting apparatus
8 Trailer device
10 External unit; external server
20 Roadway
20a Lane
20b Lane
20c Road marker
21 Ego vehicle
22 Arrow
23 Preceding vehicle
24 Oncoming vehicle
25 Traffic sign
30 Lane object
30a, 30b Road marker (depiction)
31 Ego vehicle (depiction)
32 Curve area (depiction)
32a, 32b Road marker in curve area (depiction)
33a, 30b Traffic sign (depiction)
40a, 40b Adjacent lane (depiction)
61 Road user object, preceding vehicle (depiction)
62, 63 Road user object, vehicle on adjacent lane (depiction)
65 Signal object, arrow
71, 72 Oncoming traffic warning object The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a driver information system in an ego vehicle; comprising:
   detecting environment data in an environment of the ego vehicle;
   determining a physical traffic sign, which is detected in the environment of the ego vehicle;
   automatically determining, by using the environment data, whether a lane change of the ego vehicle from a current lane to an adjacent, additional lane may be safely performed; and
   generating and outputting a driver information display, comprising:
      generating a graphic adjacent lane object that represents the adjacent, additional lane; and
      based on the determining whether the lane change may be safely performed, generating a graphic traffic sign object on the lane object or at its edge, which graphic traffic sign object visually indicates whether the lane change may be safely performed and which graphic traffic sign object is configured according to the determined physical traffic sign; wherein
   the driver information display does not include an output of a video image that is detected by a camera of the ego vehicle.

2. The method of claim 1, further comprising:
   determining a position of the ego vehicle; and
   determining, by using map data, whether the lane change may be safely performed.

3. The method of claim 2, wherein the environment data are detected using sensors of the ego vehicle.

4. The method of claim 2, wherein the graphic depiction feature of the adjacent lane object relates to one or more of a brightness, color, transparency, a contrast, a dynamic depiction, highlighting, or a pattern.

5. The method of claim 2, wherein the adjacent lane object is generated so that it corresponds to a perspective depiction of a course of the road lying in front of the ego vehicle, and comprises a radius of curvature such that the actual radius of curvature of a curve of the course of the road is output.

6. The method of claim 1, wherein the environment data are detected using sensors of the ego vehicle.

7. The method of claim 6, wherein the graphic depiction feature of the adjacent lane object relates to one or more of a brightness, color, transparency, a contrast, a dynamic depiction, highlighting, or a pattern.

8. The method of claim 6, wherein the adjacent lane object is generated so that it corresponds to a perspective depiction of a course of the road lying in front of the ego vehicle, and comprises a radius of curvature such that the actual radius of curvature of a curve of the course of the road is output.

9. The method of claim 1, wherein the graphic depiction feature of the adjacent lane object relates to one or more of a brightness, color, transparency, a contrast, a dynamic depiction, highlighting, or a pattern.

10. The method of claim 9, wherein the adjacent lane object is generated so that it corresponds to a perspective depiction of a course of the road lying in front of the ego vehicle, and comprises a radius of curvature such that the actual radius of curvature of a curve of the course of the road is output.

11. The method of claim 1, wherein the adjacent lane object is generated so that it corresponds to a perspective depiction of a course of the road lying in front of the ego vehicle, and comprises a radius of curvature such that the actual radius of curvature of a curve of the course of the road is output.

12. The method of claim 1, further comprising:
determining a radius of curvature of a curve lying in front of the ego vehicle;
detecting movement data of the ego vehicle;
determining a criticality by using the detected movement data and the detected radius of curvature; and
generating a graphic lane object with a highlight feature that is generated depending on the determined criticality.

13. The method of claim 12, further comprising:
detecting road surface properties; and
determining the criticality by using the detected road surface features.

14. A driver information system in an ego vehicle, with
at least one sensor that is configured to detect environment data in an environment of the ego vehicle;
an evaluation circuit that, by using the environment data, is configured to automatically determine whether a lane change of the ego vehicle from a current lane to an adjacent, additional lane may be safely carried out and to determine a physical traffic sign using the environment data, which is detected in the environment of the ego vehicle; and
a control circuit that is configured to generate and output a driver information display; wherein
the driver information display is generated so that the driver information display comprises a graphic adjacent lane object that represents the adjacent, additional lane; and
the driver information display is generated, based on the determining whether the lane change may be safely performed, so that the driver information comprises a graphic traffic sign object on the lane object or at its edge, which graphic traffic sign object visually indicates whether the lane change may be safely carried out and which graphic traffic sign object is configured according to the determined physical traffic sign; wherein
the driver information display does not include an output of a video image that is detected by a camera of the ego vehicle.

15. The driver information system of claim 14, further comprising a display comprises a field-of-vision display for outputting the driver information display.

* * * * *